US009240609B2

(12) United States Patent
Fukuta et al.

(10) Patent No.: US 9,240,609 B2
(45) Date of Patent: Jan. 19, 2016

(54) FUEL CELL AND APPARATUS FOR PRODUCING FUEL CELL

(75) Inventors: Masahiro Fukuta, Tochigi-ken (JP);
Yasuhide Fukushima, Utsunomiya (JP);
Masami Kurimoto, Utsunomiya (JP);
Yohei Kataoka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 711 days.

(21) Appl. No.: 13/439,272

(22) Filed: Apr. 4, 2012

(65) Prior Publication Data
US 2012/0258379 A1    Oct. 11, 2012

(30) Foreign Application Priority Data

Apr. 7, 2011    (JP) .................................. 2011-085540

(51) Int. Cl.
*H01M 8/24*    (2006.01)
*H01M 8/02*    (2006.01)
*H01M 8/10*    (2006.01)

(52) U.S. Cl.
CPC ............ *H01M 8/242* (2013.01); *H01M 8/0206* (2013.01); *H01M 8/0228* (2013.01); *H01M 8/0254* (2013.01); *H01M 8/0267* (2013.01); *H01M 8/0297* (2013.01); *H01M 8/028* (2013.01); *H01M 2008/1095* (2013.01); *Y02E 60/50* (2013.01); *Y10T 156/1744* (2015.01)

(58) Field of Classification Search
None
See application file for complete search history.

(56) References Cited

U.S. PATENT DOCUMENTS

| 6,475,656 | B1 | 11/2002 | Koschany et al. |
| 7,256,099 | B2 | 8/2007 | Takahashi et al. |
| 2002/0192532 | A1* | 12/2002 | Inagaki et al. .................. 429/39 |
| 2006/0254047 | A1 | 11/2006 | Stroebel et al. |
| 2007/0231661 | A1 | 10/2007 | Hayashi |
| 2008/0008923 | A1 | 1/2008 | Numao |

FOREIGN PATENT DOCUMENTS

| CN | 1619729 A | 5/2005 |
| DE | 197 03 214 C1 | 11/1988 |
| DE | 11 2005 000 945 T5 | 2/2007 |
| JP | 2001-110436 A | 4/2001 |
| JP | 2003-086229 A | 3/2003 |
| JP | 2004511067 A | 4/2004 |
| JP | 2009-176490 A | 8/2009 |
| JP | 2011028907 A | 2/2011 |

OTHER PUBLICATIONS

Office Action dated Jun. 24, 2014 issued over the corresponding Japanese Patent Application 2011-085540 with the English translation of pertinent portion.
Office Action dated Mar. 31, 2014 issued over the corresponding Chinese Patent Application No. 201210100042.3 with the English translation of the pertinent portion.

* cited by examiner

*Primary Examiner* — Sarah A Slifka
(74) *Attorney, Agent, or Firm* — Carrier Blackman & Associates, P.C.; Joseph P. Carrier; William D. Blackman

(57) ABSTRACT

A fuel cell is formed by stacking membrane electrode assemblies and metal separators. The metal separator is formed by adhering and joining together an anode separator and a cathode separator. In the metal separator, a step is provided on an outer circumferential end of the cathode separator, the step being spaced from an outer circumferential end of the anode separator. An adhesive layer is formed on the step between the outer circumferential end of the cathode separator and the outer circumferential end of the anode separator.

7 Claims, 13 Drawing Sheets

FUEL CELL AND APPARATUS FOR PRODUCING FUEL CELL

CROSS-REFERENCE TO RELATED APPLICATION

This application is based upon and claims the benefit of priority from Japanese Patent Application No. 2011-085540 filed on Apr. 7, 2011, of which the contents are incorporated herein by reference.

BACKGROUND OF THE INVENTION

1. Field of the Invention

The present invention relates to a fuel cell formed by stacking membrane electrode assemblies and separators. Each of the membrane electrode assemblies includes a pair of electrodes and an electrolyte membrane interposed between the electrodes. Further, the present invention relates to an apparatus for producing such a fuel cell.

2. Description of the Related Art

For example, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode to form a membrane electrode assembly (electrolyte electrode assembly) (MEA). The anode and the cathode each includes an electrolyte catalyst layer and porous carbon. The membrane electrode assembly is sandwiched between separators (bipolar plates) to form a unit cell. In use, generally, a predetermined number of unit cells are stacked together to form a fuel cell stack, which is mounted in a vehicle, for example.

The separators include an anode side separator having a fuel gas flow field facing the anode for allowing a fuel gas to flow along the anode, and a cathode side separator having an oxygen-containing gas flow field facing the cathode for allowing an oxygen-containing gas to flow along the cathode. The anode side separator and the cathode side separator overlap each other to form a coolant flow field for allowing a coolant to flow along the anode side separator and the cathode side separator.

Therefore, in particular, in the case of producing a fuel cell stack mounted in a vehicle, a considerably large number of membrane electrode assemblies, anode side separators, and cathode side separators need to be prepared individually. Thus, operations for handling such parts are complicated, assembly performance of the fuel cell stack is low, and the fuel cell stack cannot be produced efficiently.

In this regard, for example, a fuel cell disclosed in Japanese Laid-Open Patent Publication No. 2009-176490 is known. As shown in FIG. 13, such a fuel cell includes a first separator plate 2 and a second separator plate 4. The first separator plate 2, which is made of a porous material, has a fuel gas flow field 1 for supplying a fuel gas to a fuel electrode. The second separator plate 4, which also is made of a porous material, has an oxygen-containing gas flow field 3 for supplying an oxygen-containing gas to an oxygen-containing gas electrode.

The first separator plate 2 and the second separator plate 4 are attached together to form a coolant water flow field 5 between the first separator plate 2 and the second separator plate 4. An adhesive sheet 6 is attached to side surfaces of the first separator plate 2 and the second separator plate 4. An adhesive is not applied to surfaces where the first separator plate 2 and the second separator plate 4 are attached together.

Thus, according to the disclosure, when water in the coolant water flow field 5 moves from the fuel gas flow field 1 to the oxygen-containing gas flow field 3, a water repellent adhesive does not prevent movement of water.

SUMMARY OF THE INVENTION

In Japanese Laid-Open Patent Publication No. 2009-176490, in order to ensure that movement of water is not prevented, the adhesive sheet 6 is attached only to side surfaces of the first separator plate 2 and the second separator plate 4. Thus, the adhesion strength of the first separator plate 2 and the second separator plate 4 is low, and consequently, the first separator plate 2 can be peeled off from the second separator plate 4 easily.

Japanese Laid-Open Patent Publication No. 2009-176490 discloses an embodiment in which adhesive is applied only to surfaces where the first separator plate 2 and the second separator plate 4 are attached together. However, since the adhesive is simply applied to surfaces where the first separator plate 2 and the second separator plate 4 are attached together, a sufficient adhesion strength may not be obtained. That is, since an adhesive sheet is not provided on side surfaces of the first separator plate 2 and the second separator plate 4, a disadvantage results in that the adhesion strength is low.

The present invention has been made as a solution to problems of this type. An object of the present invention is to provide a fuel cell and an apparatus for producing a fuel cell, which make it possible for separators or membrane electrode assemblies to be adhered together easily and reliably, to thereby efficiently produce the entire fuel cell with a simple structure.

The present invention relates to a fuel cell formed by stacking membrane electrode assemblies and separators. Each of the membrane electrode assemblies includes a pair of electrodes, and an electrolyte membrane interposed between the electrodes.

In the fuel cell, a step is provided on an outer circumferential end of at least one of the separators, which are adjacent to each other, such that the step is spaced from an outer circumferential end of the other of the separators, to thereby form an adhesive layer by filling, with an adhesive, a gap between the outer circumferential ends of the adjacent separators, and the adhesive layer is provided to cover outer circumferential end surfaces of the separators from the step.

Further, according to another aspect of the invention, in the fuel cell, a resin frame member is formed integrally with an outer circumference of the membrane electrode assembly. In adjacent membrane electrode assemblies, which sandwich the separator therebetween, a step is provided on an outer circumferential end of at least one of the resin frame members, which are adjacent to each other, such that the step is spaced from an outer circumferential end of the other of the resin frame members, to thereby form an adhesive layer by filling, with an adhesive, a gap between the outer circumferential ends of the adjacent resin frame members. Further, the adhesive layer is provided to cover outer circumferential end surfaces of the resin frame members from the step.

Further, an apparatus for producing a fuel cell includes a first die member and a second die member. In a state in which two adhesion targets of the separators or the membrane electrode assemblies are stacked together, and an adhesive is provided as an adhesive layer on a step formed between the two adhesion targets, the first die member contacts one of the adhesion targets, and the second die member contacts the other of the adhesion targets.

Then, in a state in which the first die member and the second die member are closed together, a space is provided between outer circumferential end surfaces of the adhesion targets to form an end surface adhesive layer.

In the present invention, the adhesive layer is formed on the step between outer circumferential ends of the adjacent separators. In such a structure, the adhesion strength of the adhesive is improved suitably. Further, the adhesive layer is provided so as to cover outer circumferential end surfaces of the separators from the step. Thus, in adjacent separators, since the adhesive layer is provided on the step formed between outer circumferential ends and outer circumferential end surfaces of the separators, a desired adhesion strength can be achieved reliably.

With such a simple structure, the separators can be adhered together easily and reliably, and the entire fuel cell can be produced efficiently and advantageously.

Further, according to the present invention, the adhesive layer is formed on the step between outer circumferential ends of the adjacent resin frame members. In such a structure, the adhesion strength of the adhesive is improved suitably. Further, the adhesive layer is provided to cover outer circumferential end surfaces of the resin frame members from the step. Thus, in the adjacent membrane electrode assemblies, since the adhesive layer is provided on the step, which is formed between outer circumferential ends and outer circumferential end surfaces of the resin frame members, a desired adhesion strength can be obtained reliably.

With a simple structure, the membrane electrode assemblies can be adhered together easily and reliably, and production of the entire fuel cell can be achieved efficiently and advantageously.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
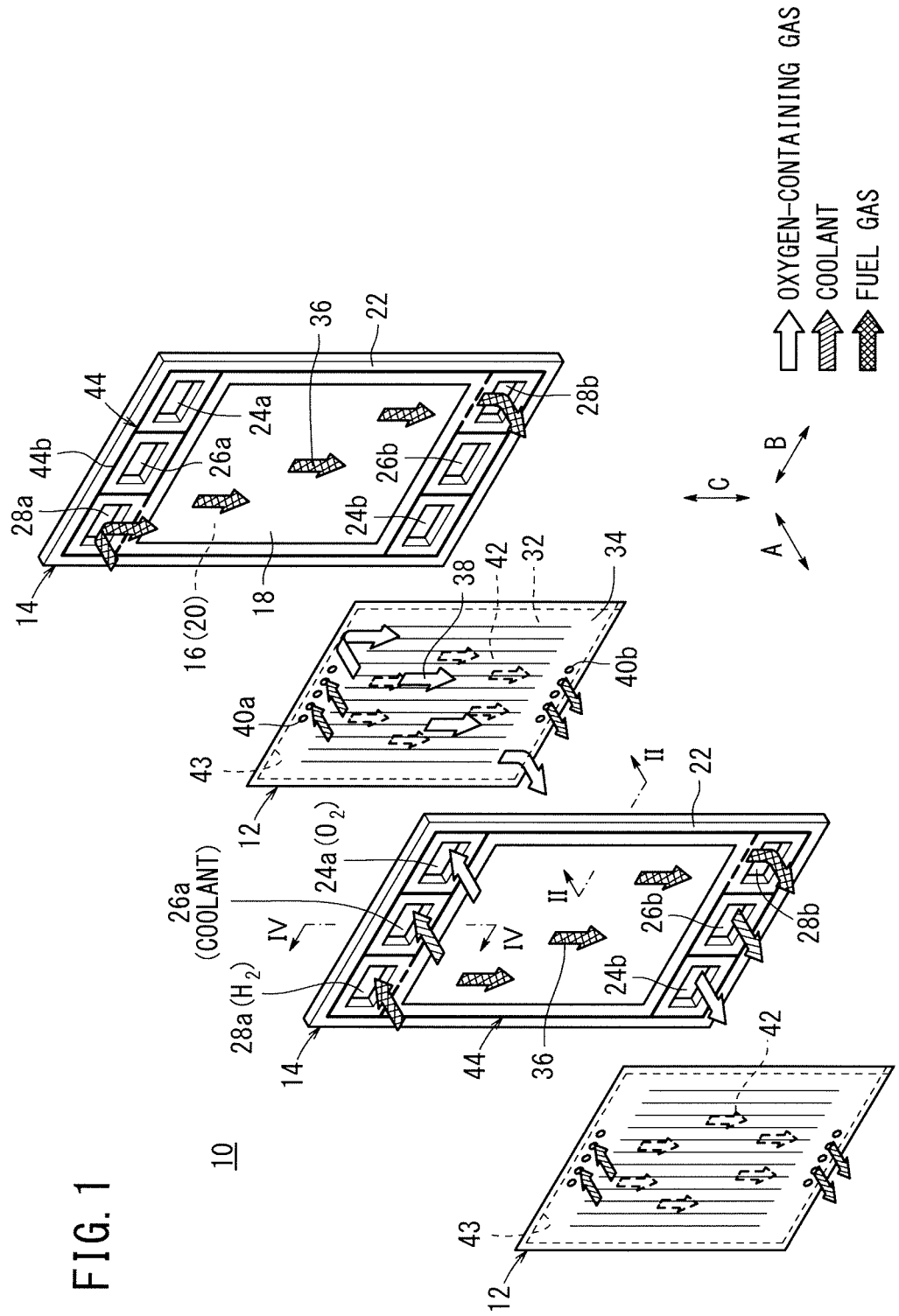
FIG. 1 is an exploded perspective view showing main components of a fuel cell according to a first embodiment of the present invention.
Figure 2:
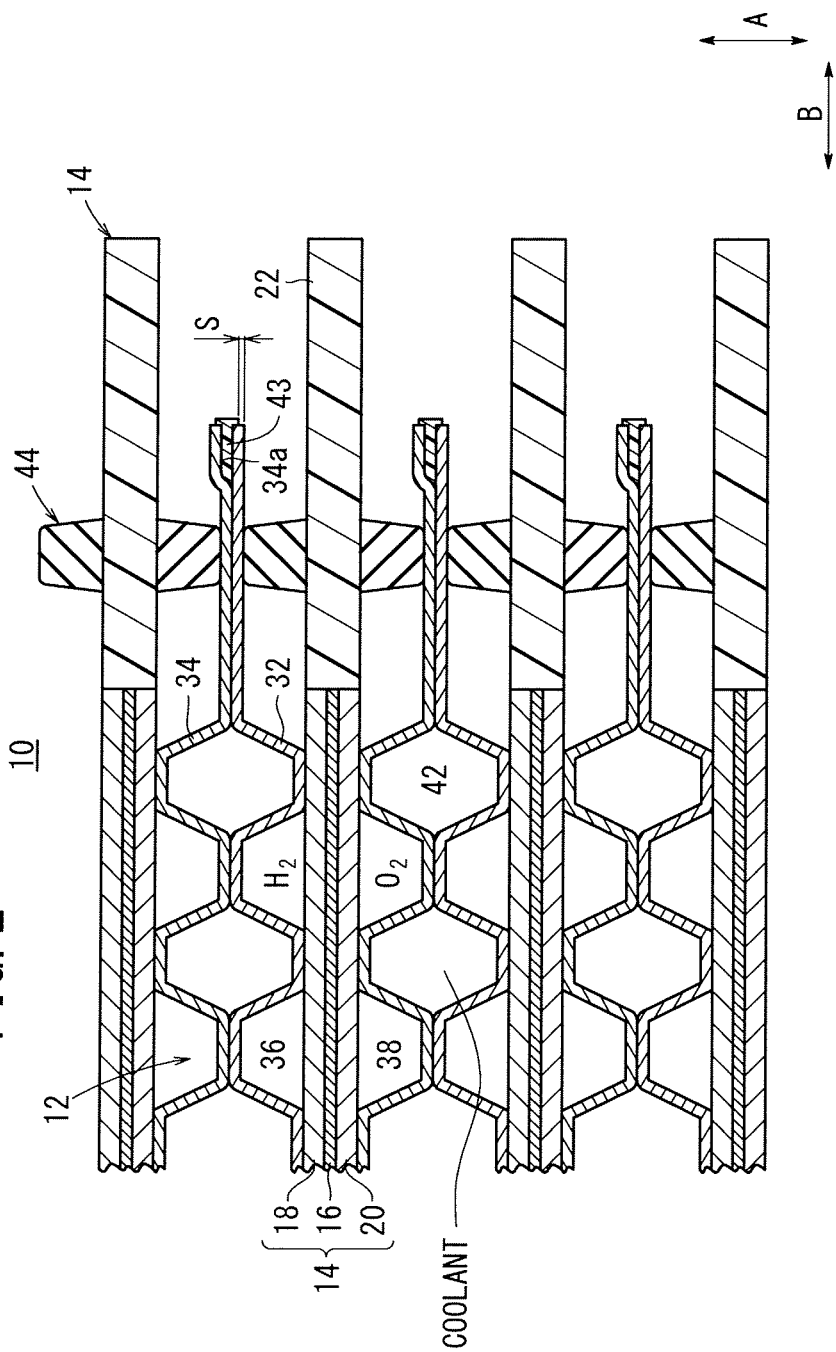
FIG. 2 is a cross sectional view showing the fuel cell, taken along line II-II in FIG. 1.

As shown in FIGS. 1 and 2, a fuel cell 10 according to a first embodiment of the present invention is formed by alternately stacking metal separators 12 and membrane electrode assemblies (MEAs) 14.

As shown in FIG. 2, the membrane electrode assembly 14 includes an anode 18, a cathode 20, and a solid polymer electrolyte membrane 16 interposed between the anode 18 and the cathode 20. The solid polymer electrolyte membrane 16 is formed by impregnating a thin membrane of perfluorosulfonic acid with water, for example. The anode 18 and the cathode 20 each includes a gas diffusion layer (not shown) such as carbon paper, and an electrode catalyst layer (not shown) of platinum alloy supported on porous carbon particles. Carbon particles are deposited uniformly on the surface of the gas diffusion layer. The electrode catalyst layer of the anode 18 and the electrode catalyst layer of the cathode 20 are fixed to both surfaces of the solid polymer electrolyte membrane 16, respectively.

The surface area of the solid polymer electrolyte membrane 16 is equal to or larger than the surface area of the anode 18 and the cathode 20. A resin frame (frame member) 22 is formed integrally with the outer circumferential end of the solid polymer electrolyte membrane 16, e.g., by injection molding. For the resin material, in addition to a general-purpose plastic, for example, engineering plastic, super engineering plastic, or the like, may be used.

As shown in FIG. 1, at one end (upper end) of the frame 22 in the direction indicated by the arrow C, an oxygen-containing gas supply passage 24a for supplying an oxygen-containing gas, a coolant supply passage 26a for supplying a coolant, and a fuel gas supply passage 28a for supplying a fuel gas such as a hydrogen-containing gas are arranged in a horizontal direction, as indicated by the arrow B. The oxygen-containing gas supply passage 24a, the coolant supply passage 26a, and the fuel gas supply passage 28a extend through the frame 22 in the direction indicated by the arrow A.

At the other end (lower end) of the frame 22 in the direction indicated by the arrow C, a fuel gas discharge passage 28b for discharging the fuel gas, a coolant discharge passage 26b for discharging the coolant, and an oxygen-containing gas discharge passage 24b for discharging the oxygen-containing gas are arranged in the horizontal direction, as indicated by the arrow B. The fuel gas discharge passage 28b, the coolant discharge passage 26b, and the oxygen-containing gas discharge passage 24b extend through the frame 22 in the direction indicated by the arrow A.

The outer circumference of the metal separator 12 is positioned inside the oxygen-containing gas supply passage 24a, the coolant supply passage 26a, the fuel gas supply passage 28a, the fuel gas discharge passage 28b, the coolant discharge passage 26b, and the oxygen-containing gas discharge passage 24b.

As described later, the metal separator 12 is formed by adhering together the anode separator 32 and the cathode separator 34. The anode separator 32 faces the anode 18 of the membrane electrode assembly 14, whereas the cathode separator 34 faces the cathode 20 of the membrane electrode assembly 14. For example, the anode separator 32 and the cathode separator 34 are made of steel plates, stainless steel plates, aluminum plates, plated steel sheets, or metal plates having an anti-corrosive surface formed thereon by a surface treatment.

Figure 3:
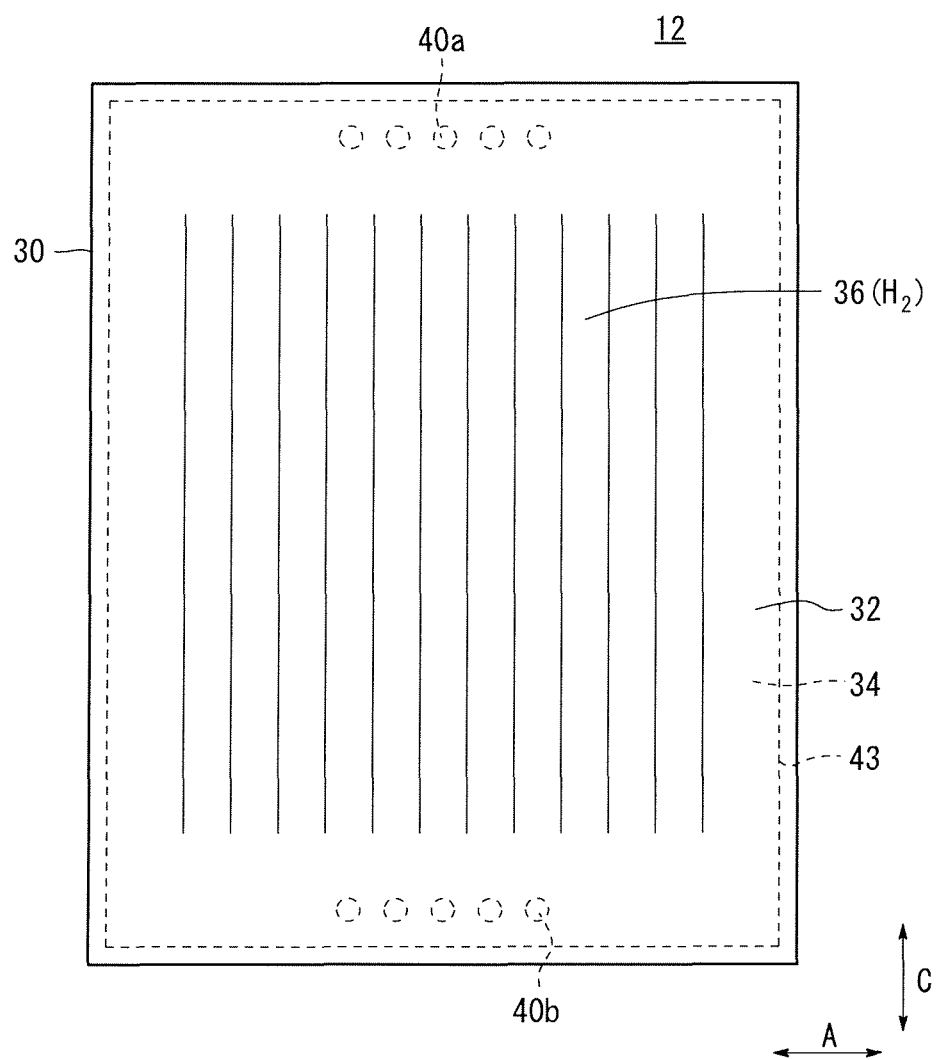
FIG. 3 is a front view showing the metal separator.

As shown in FIG. 3, a fuel gas flow field 36 is formed on the anode separator 32 of the metal separator 12 by pressure forming and corrugating the anode separator 32 so as to have grooves and ridges in cross section. The fuel gas flow field 36 extends in the direction indicated by the arrow C for enabling the fuel gas to flow vertically from upper to lower positions.

As shown in FIG. 1, an oxygen-containing gas flow field 38 is formed on the cathode separator 34 of the metal separator 12 by pressure forming and corrugating the cathode separator 34 to have ridges and grooves in cross section. The oxygen-containing gas flows in the oxygen-containing gas flow field 38 in the direction indicated by the arrow C. A plurality of coolant supply holes 40a are formed above the oxygen-containing gas flow field 38, and a plurality of coolant discharge holes 40b are formed below the oxygen-containing gas flow field 38.

A coolant flow field 42 is formed inside the metal separator 12. The coolant flow field 42 is connected to the coolant supply holes 40a and the coolant discharge holes 40b for enabling the coolant to flow in the direction indicated by the arrow C (see FIGS. 1 and 4). The coolant flow field 42 is formed between the back surface of the fuel gas flow field 36 and the back surface of the oxygen-containing gas flow field 38 when the back surface of the fuel gas flow field 36 and the back surface of the oxygen-containing gas flow field 38 are overlapped with each other.

As shown in FIG. 2, in the metal separator 12, a step 34a is provided on the outer circumferential end of the cathode separator 34. The step 34a is spaced from the outer circumferential end of the anode separator 32. An adhesive layer 43 is formed on the step 34a between the outer circumferential end of the cathode separator 34 and the outer circumferential end of the anode separator 32. It is sufficient if the step 34a is provided only on sides where the cathode separator 34 and the anode separator 32 need to be adhered together.

The adhesive layer 43 is made of adhesive, e.g., a hot melt adhesive sheet 64 (to be described later). The adhesive layer 43 covers outer circumferential end surfaces of the cathode separator 34 and the anode separator 32 from the step 34a. The adhesive layer 43 is spaced above the lower end of the outer circumferential end surface of the anode separator 32 by a distance S. An organic adhesive containing polyethylene terephthalate (PET) and urethane based adhesives is used as the hot melt adhesive sheet 64.

As shown in FIG. 1, a seal member 44 is formed integrally with the frame 22. The seal member 44 is made of a seal material, for example, a cushion material or a packing material such as EPDM rubber (Ethylene Propylene Diene Monomer), NBR (Nitrile Rubber), fluoro rubber, silicone rubber, fluoro silicone rubber, butyl rubber (Isobutene-Isoprene Rubber), natural rubber, styrene rubber, chloroprene rubber, or acrylic rubber.

Figure 5:
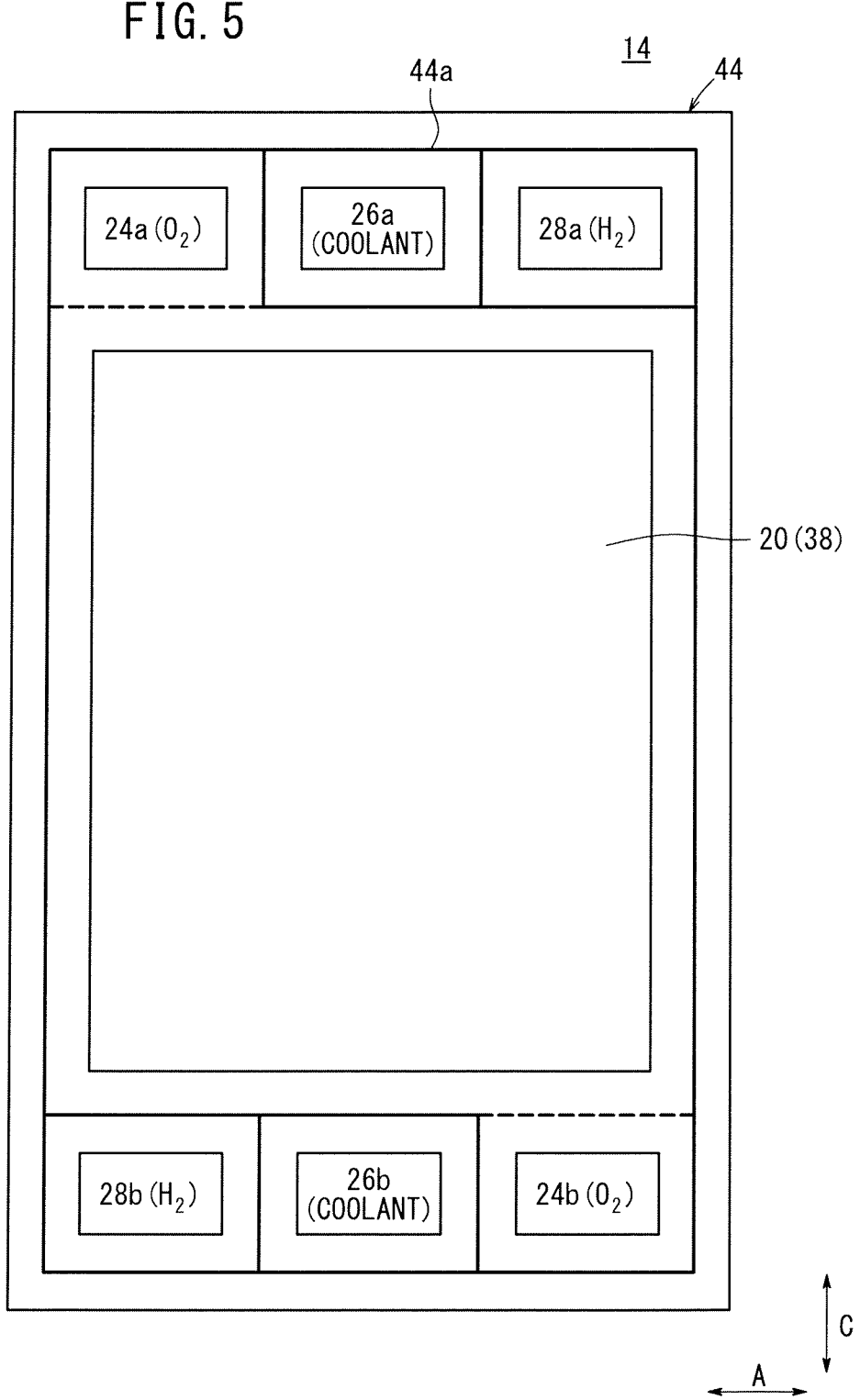
FIG. 5 is a front view showing a membrane electrode assembly of the fuel cell.

As shown in FIG. 5, the seal member 44 includes a first seal 44a on the surface of the frame 22 facing toward the cathode 20. The first seal 44a is formed around the coolant supply passage 26a, the fuel gas supply passage 28a, the fuel gas discharge passage 28b, and the coolant discharge passage 26b for preventing leakage of oxygen-containing gas from the oxygen-containing gas flow field 38, while also allowing the oxygen-containing gas to flow from the oxygen-containing gas supply passage 24a to the oxygen-containing gas flow field 38, and to flow from the oxygen-containing gas flow field 38 into the oxygen-containing gas discharge passage 24b.

Further, as shown in FIG. 1, the seal member 44 includes a second seal 44b on the surface of the frame 22 facing toward the anode 18. The second seal 44b is formed around the oxygen-containing gas supply passage 24a, the coolant supply passage 26a, the coolant discharge passage 26b, and the oxygen-containing gas discharge passage 24b for preventing leakage of fuel gas from the fuel gas flow field 36, while also allowing the fuel gas to flow from the fuel gas supply passage 28a to the fuel gas flow field 36, and to flow from the fuel gas flow field 36 into the fuel gas discharge passage 28b.

In the fuel cell 10 having the above structure, as shown in FIG. 1, oxygen-containing gas, which is supplied to the oxygen-containing gas supply passage 24a, is supplied to the oxygen-containing gas flow field 38 of the metal separator 12. After the oxygen-containing gas has flowed along the cathode 20 of the membrane electrode assembly 14 in the direction of the arrow C, the oxygen-containing gas is discharged into the oxygen-containing gas discharge passage 24b.

Meanwhile, a fuel gas such as a hydrogen-containing gas, which is supplied to the fuel gas supply passage 28a, is supplied to the fuel gas flow field 36 of the metal separator 12. After the fuel gas has flowed along the fuel gas flow field 36 in the direction of the arrow C, the fuel gas is discharged into the fuel gas discharge passage 28b.

Thus, in the membrane electrode assembly 14, oxygen-containing gas supplied to the cathode 20 and fuel gas supplied to the anode 18 are consumed in electrochemical reactions at catalyst layers of the cathode 20 and the anode 18 for thereby generating electricity.

Figure 4:
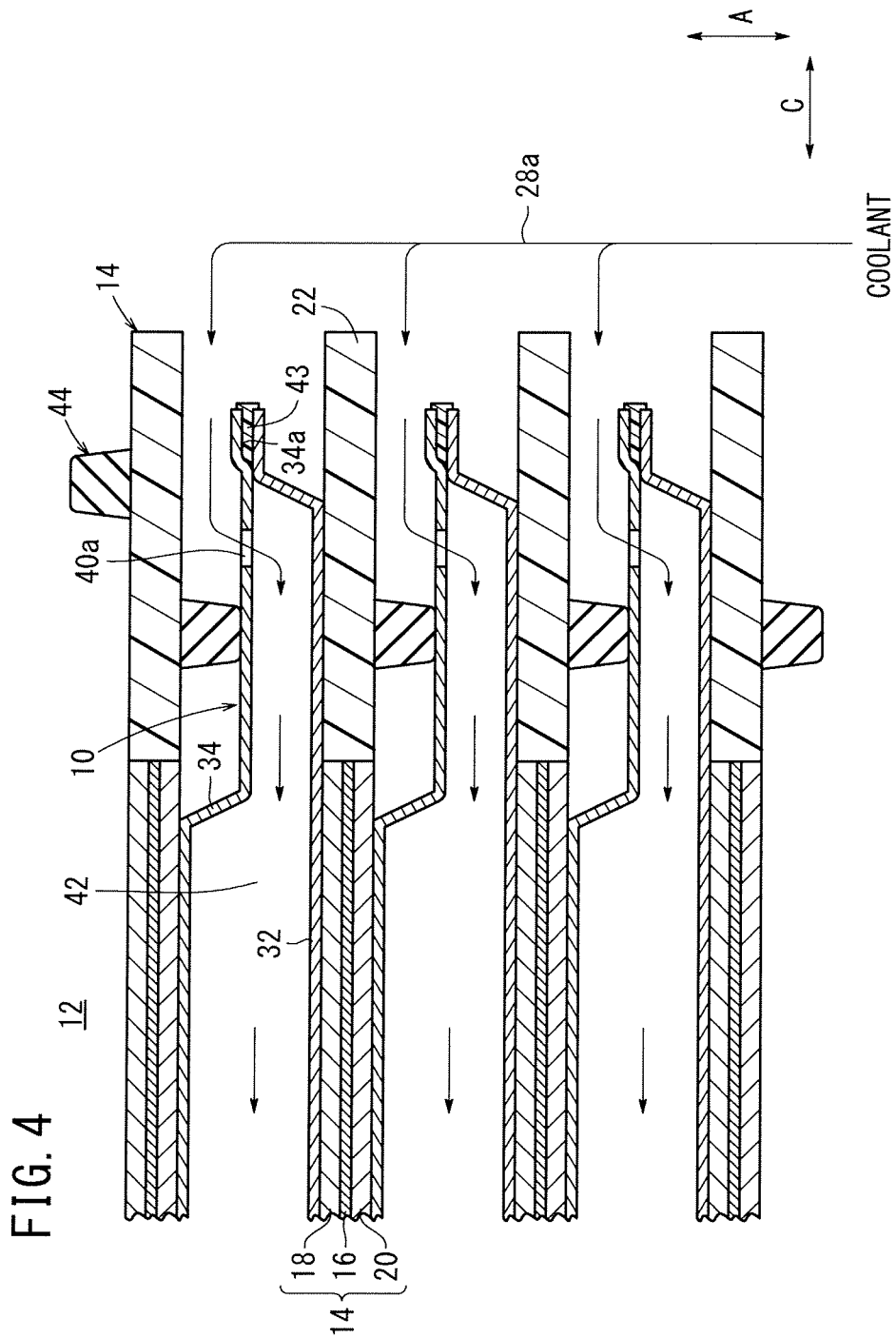
FIG. 4 is a cross sectional view showing the fuel cell, taken along line IV-IV in FIG. 1.

Further, a coolant such as pure water, ethylene glycol, or oil is supplied to the coolant supply passage 26a. As shown in FIG. 4, the coolant is supplied into the metal separator 12 through the coolant supply holes 40a, which are formed in the cathode separator 34 of the metal separator 12.

The coolant flow field 42 is formed inside the metal separator 12. Thus, after the coolant has flowed along the coolant flow field 42 in the direction of the arrow C, the coolant is discharged from the coolant discharge holes 40b into the coolant discharge passage (see FIG. 1).

Next, operations for producing the metal separator 12 will be described below.

Figure 6:
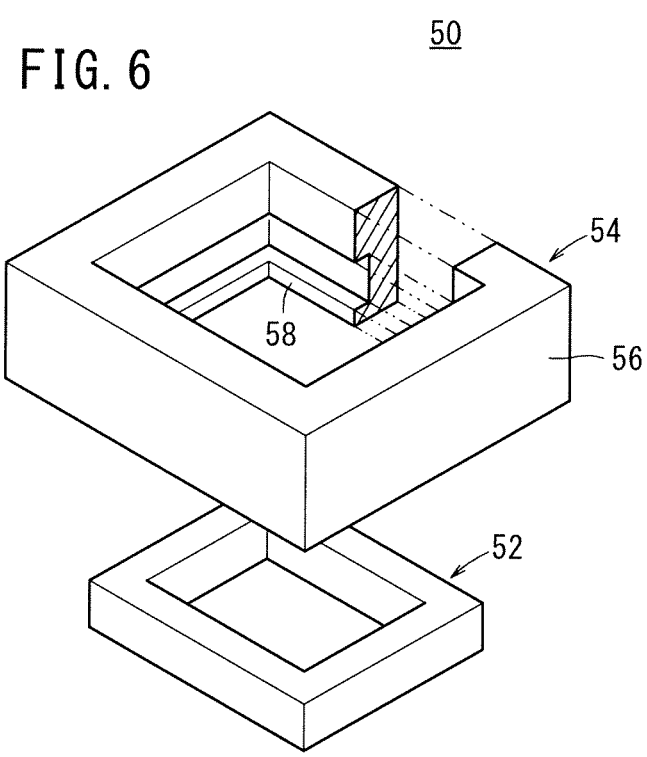
FIG. 6 is a perspective view showing main components of an apparatus for producing the metal separator.
Figure 7:
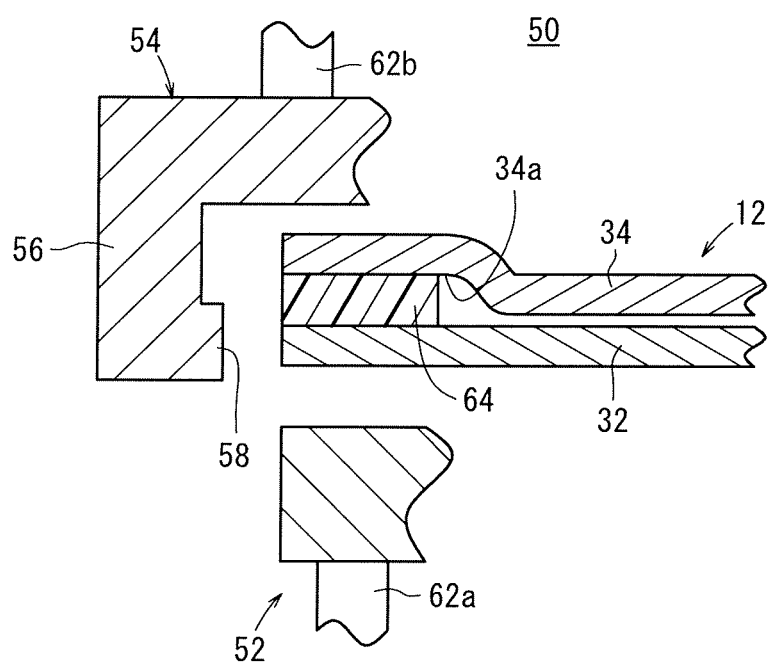
FIG. 7 is a view showing operations of the production apparatus.

As shown in FIGS. 6 and 7, a production apparatus 50 includes a first die member 52 and a second die member 54. The first die member 52 and the second die member 54 form a heat sealer that includes a heating function.

The first die member 52 has a rectangular frame shape corresponding to the outer shape of the metal separator 12. The first die member 52 is placed around the anode separator 32, which forms one of the adhesion targets. The second die member 54 has a rectangular frame shape corresponding to the outer shape of the metal separator 12. The second die member 54 is placed around the cathode separator 34, which forms the other of the adhesion targets.

Figure 8:
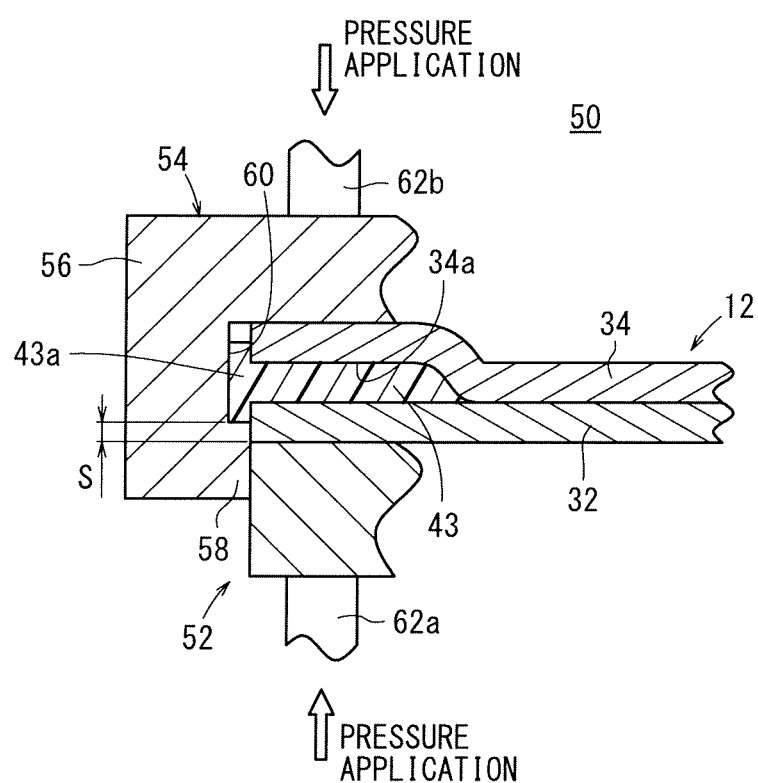
FIG. 8 is a view showing operations of the production apparatus.

The second die member 54 has a skirt 56 that protrudes toward the first die member 52 around the cathode separator 34 and the anode separator 32. An expansion 58 that protrudes inwardly is formed on the inner surface at the lower end of the skirt 56. As shown in FIG. 8, when the first die member 52 and the second die member 54 are closed together, a space 60 in which an end surface adhesive layer 43a is provided is formed between outer circumferential end surfaces of the cathode separator 34 and the anode separator 32. The expansion 58 contacts the outer circumferential end surface of the anode separator 32 up to a position that is spaced above the lower end of the anode separator 32 by a distance S.

The first die member 52 is attached to a first set die 62a, and the second die member 54 is attached to a second set die 62b.

The first set die 62*a* and the second set die 62*b* are capable of moving back and forth relative to each other.

In the production apparatus 50 having the above structure, as shown in FIG. 7, in a state in which the first die member 52 and the second die member 54 are spaced from each other, the anode separator 32 and the cathode separator 34 are stacked together between the first die member 52 and the second die member 54. A hot melt adhesive sheet 64 is provided between the anode separator 32 and the cathode separator 34 at a location corresponding to the step 34*a*.

Then, as shown in FIG. 8, the first die member 52 and the second die member 54 are heated to a predetermined temperature, and are closed together under a predetermined pressure. Thus, pressure is applied to the anode separator 32 and the cathode separator 34 in a direction that causes the anode separator 32 and the cathode separator 34 to be placed in tight contact with each other, and thereafter, the anode separator 32 and the cathode separator 34 are heated. The hot melt adhesive sheet 64, which is in a liquid state, flows from the step 34*a* into the space 60, whereupon the hot melt adhesive sheet 64 solidifies. In this manner, the adhesive layer 43 is formed on the step 34*a*, the adhesive layer 43 including the end surface adhesive layer 43*a*, which is formed in the space 60.

In the first embodiment, the adhesive layer 43 is formed on the step 34*a* between outer circumferential ends of the anode separator 32 and the cathode separator 34, which are adjacent to each other. In this structure, the adhesion strength by the hot melt adhesive sheet 64, which serves as an adhesive, is improved suitably.

Further, the adhesive layer 43 is provided so as to cover outer circumferential end surfaces (the end surface adhesive layer 43*a*) of the anode separator 32 and the cathode separator 34 from the step 34*a*. Thus, in the anode separator 32 and the cathode separator 34, which are adjacent to each other, the adhesive layer 43 is provided integrally with the step 34*a* that is formed between outer circumferential ends and outer circumferential end surfaces of the anode separator 32 and the cathode separator 34. In such a structure, a desired adhesion strength for the metal separator 12 can be obtained reliably.

With a simple structure, the anode separator 32 and the cathode separator 34 can be adhered together easily and reliably, and the entire fuel cell 10 can be produced efficiently and advantageously.

Further, in the production apparatus 50, the expansion 58 contacts the outer circumferential end surface of the anode separator 32 up to a position that is spaced above the upper end of the anode separator 32 by the distance S. Thus, leakage of adhesive from the space 60 to the outside does not occur.

In the first embodiment, although the cathode separator 34 has the step 34*a*, the present invention is not limited in this respect. For example, the step may be provided on the anode separator 32. Alternatively, steps may be provided on both the cathode separator 34 and the anode separator 32, respectively.

Figure 9:
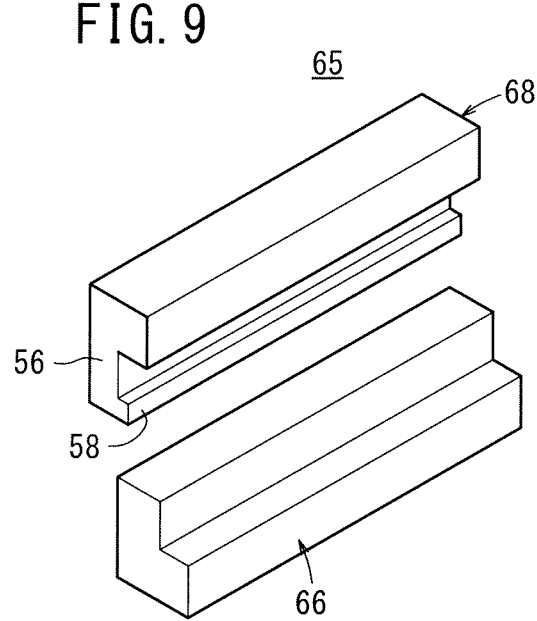
FIG. 9 is a perspective view showing main components of another production apparatus.
Figure 10:
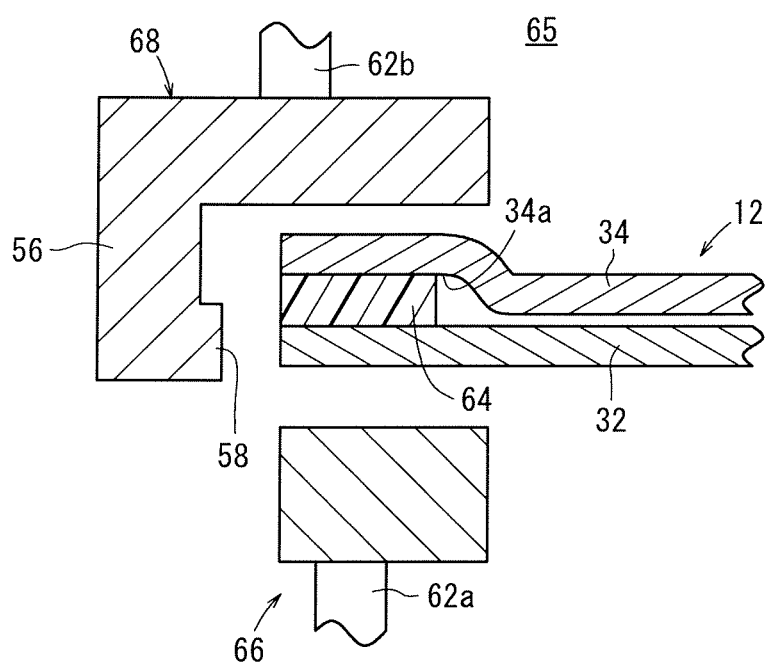
FIG. 10 is a view showing operations of the production apparatus.

Further, instead of using the production apparatus 50, for example, the production apparatus 65 shown in FIGS. 9 and 10 may be used. The production apparatus 65 includes a first die member 66 and a second die member 68. The first die member 66 and the second die member 68 are shaped substantially straight.

The first die member 66 and the second die member 68 perform an adhesion operation, one by one, for each of the sides that require adhesion of a metal separator 12 thereto. The second die member 68 has a skirt 56 and an expansion 58. The adhesion operation is performed in the same manner as in the case of the production apparatus 50. However, the adhesion operation is performed for each of the sides, one by one.

Figure 11:
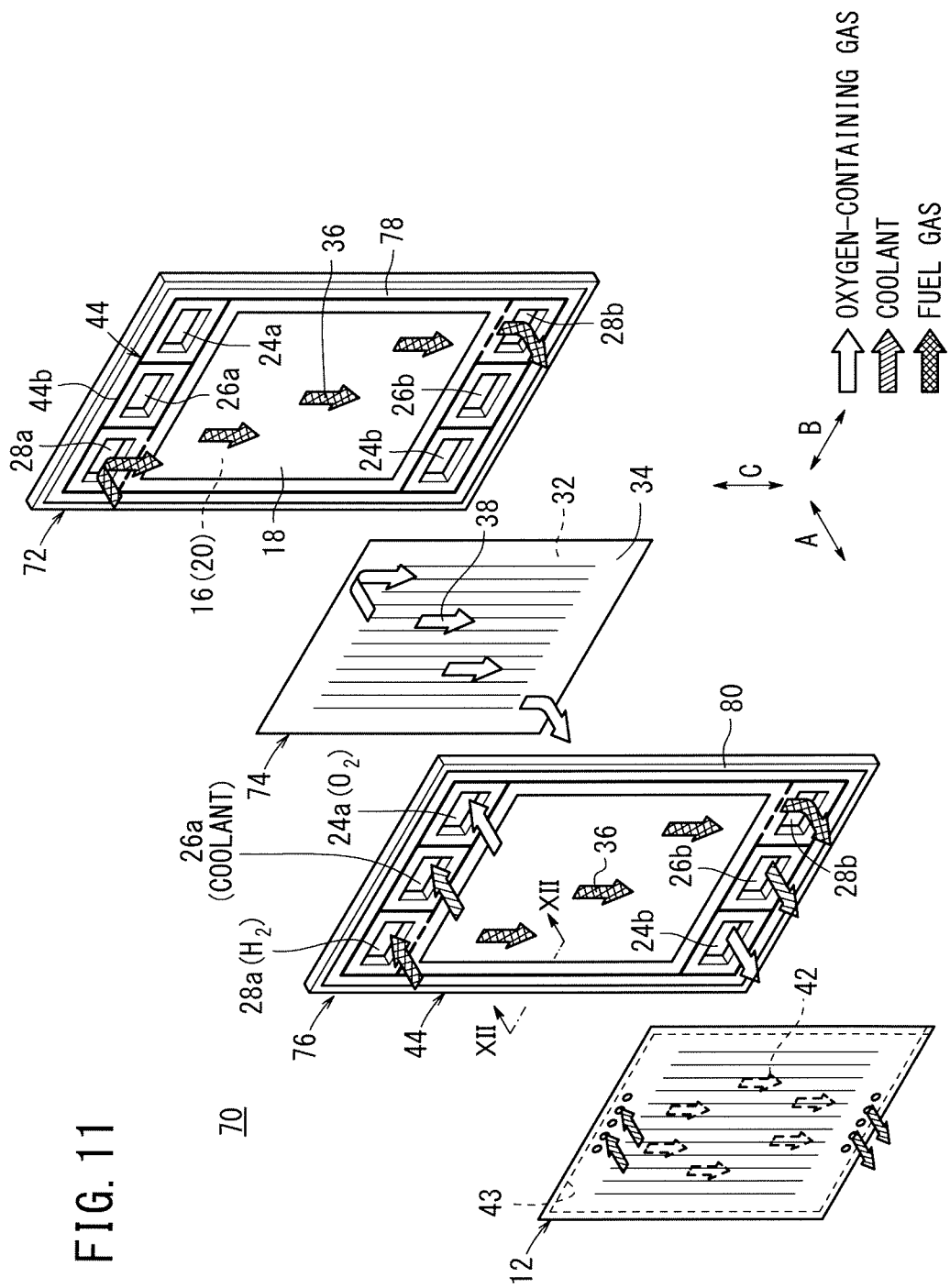
FIG. 11 is an exploded perspective view showing main components of a fuel cell according to a second embodiment of the present invention.

FIG. 11 is an exploded perspective view showing main components of a fuel cell 70 according to a second embodiment of the present invention. Constituent elements, which are the same as those of the fuel cell 10 according to the first embodiment, are labeled with the same reference numerals, and detailed descriptions of such features are omitted.

The fuel cell 70 is formed by stacking a first membrane electrode assembly 72, a metal separator 74, a second membrane electrode assembly 76, and a metal separator 12. The first membrane electrode assembly 72 and the second membrane electrode assembly 76 include resin frames (frame members) 78, 80. The outer circumferential end of the solid polymer electrolyte membrane 16 is embedded within the frames 78, 80.

Figure 12:
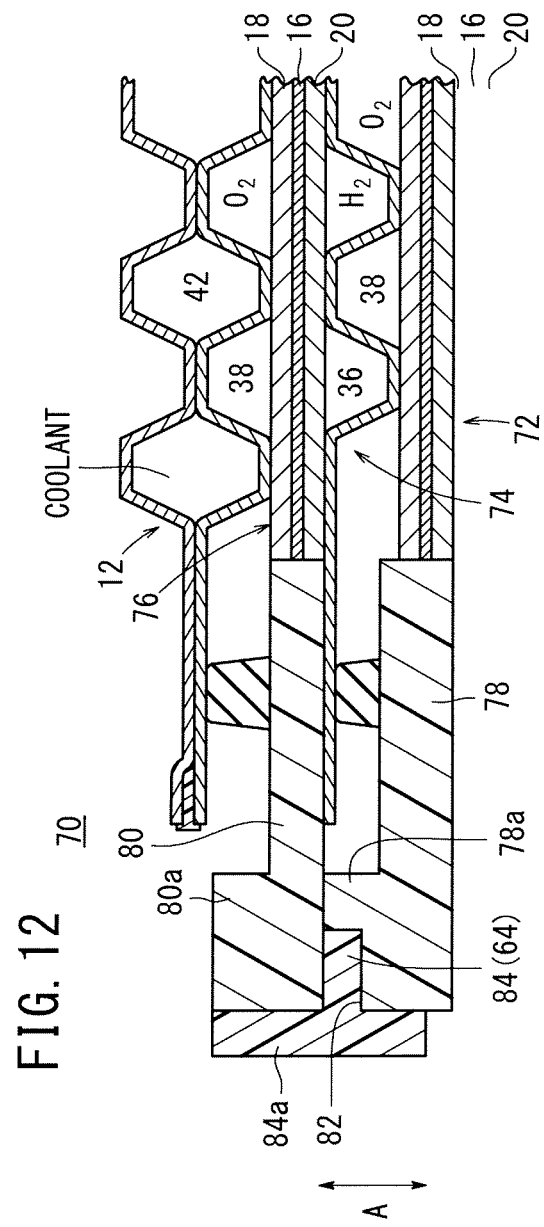
FIG. 12 is a cross sectional view showing the fuel cell, taken along line XII-XII in FIG. 11.
Figure 13:
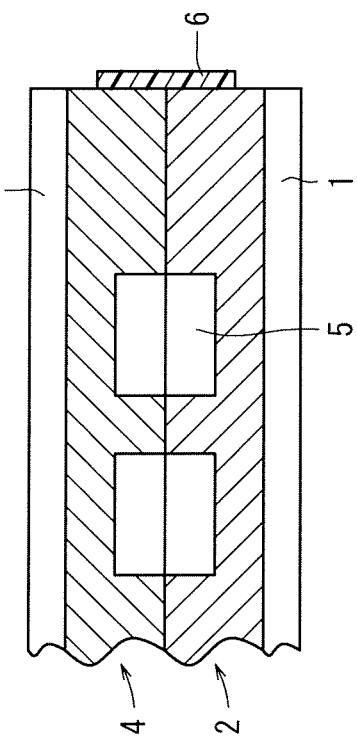
FIG. 13 is a view showing main components of the fuel cell disclosed in Japanese Laid-Open Patent Publication No. 2009-176490.

As shown in FIG. 12, thick portions 78*a*, 80*a*, which are expanded in the thickness direction (the stacking direction, as indicated by the arrow A), are provided on outer circumferential ends of the frames 78, 80. The thick portion 78*a* of the frame 78 has a step 82, which is spaced from the frame 80, and an adhesive layer 84, which is formed on the step 82 between the frames 78, 80.

The adhesive layer 84 is made of a hot melt adhesive sheet 64. The adhesive layer 84 is provided to cover outer circumferential end surfaces (the end surface adhesive layer 84*a*) of the frames 78, 80 from the step 82.

The metal separator 74 is made of a single metal plate. A fuel gas flow field 36 and an oxygen-containing gas flow field 38 are formed on both front and back surfaces of the metal plate. A coolant flow field is not provided in the metal plate. Stated otherwise, a so called skip cooling structure is adopted. The metal plate is sandwiched between first and second membrane electrode assemblies 72 and 76, which are joined together.

In the second embodiment having the aforementioned structure, the adhesive layer 84 is formed at the step 82 between outer circumferential ends of the frames 78, 80, which are adjacent to each other. Thus, an improvement in adhesion strength by the hot melt adhesive sheet 64, which serves as an adhesive, is achieved suitably. Further, the adhesive layer 84 is provided so as to cover outer circumferential end surfaces (i.e., the end surface adhesive layer 84*a*) of the frames 78, 80 from the step 82.

Thus, in the adjacent first and second membrane electrode assemblies 72, 76, the adhesive layer 84 is provided integrally with the step 82, which is formed between outer circumferential ends and outer circumferential end surfaces of the first and second membrane electrode assemblies 72, 76. With such a structure, a desired adhesion strength can reliably be achieved.

Thus, the same advantages as those of the first embodiment are obtained. For example, the first membrane electrode assembly 72 and the second membrane electrode assembly 76 can be adhered together easily and reliably, with the advantage that the fuel cell 70 as a whole can be produced efficiently.

In the second embodiment, although the frame 78 includes the step 82, the present invention is not limited in this respect. For example, the step may be provided on the frame 80. Alternatively, steps may be provided on both the frame 78 and the frame 80, respectively.

While the invention has been particularly shown and described with reference to preferred embodiments, it will be understood that variations and modifications can be effected thereto by those skilled in the art without departing from the spirit of the invention as set forth in the appended claims.

What is claimed is:

1. A fuel cell comprising: membrane electrode assemblies and separators connected together in a stack, wherein the membrane electrode assemblies each include a pair of electrodes, and an electrolyte membrane interposed between the electrodes, and two of the separators are provided between adjacent ones of the membrane electrode assemblies such that two separators have surfaces which engage each other, an outer circumferential end of at least one of the two separators includes a step which is spaced from an outer circumferential end of the other of the two separators thereby defining a gap between the outer circumferential ends of the two separators;

an adhesive layer is provided which both fills the gap and integrally includes an end surface adhesive layer which protrudes outwardly from the outer circumferential ends of the two separators and extends in a thickness direction of the two separators to cover outer circumferential end surfaces of the two separators, such that the adhesive layer has a substantially T-shaped cross section as a whole, thereby bonding the two separators together, at least one of the outer circumferential end surfaces of the two separators includes a first side edge forming the gap and a second side edge distant from the gap in the thickness direction, and the end surface adhesive layer is terminated at a position between the first side edge and the second side edge.

2. The fuel cell according to claim 1, wherein the separators are metal separators, and a coolant flow field is formed between the two separators, for allowing a coolant to flow along surfaces of the two separators.

3. The fuel cell according to claim 1, wherein the adhesive is a hot melt adhesive.

4. The fuel cell according to claim 1, wherein the outer circumferential end surfaces of the two separators which are covered by the adhesive layer extend away from the gap.

5. A fuel cell comprising: membrane electrode assemblies and separators connected together in a stack, wherein the membrane electrode assemblies each include a pair of electrodes, and an electrolyte membrane interposed between the electrodes, each of the membrane electrode assemblies includes a resin frame member provided integrally with an outer circumference thereof;

adjacent ones of membrane electrode assemblies sandwich two of the separators therebetween, and outer circumferential ends of the resin frame members of the adjacent membrane electrode assemblies have surfaces which engage each other, the outer circumferential end of at least one of the resin frame members includes a step which is spaced from the outer circumferential end of the other of the resin frame members thereby defining a gap between the outer circumferential ends of the adjacent resin frame members; and an adhesive layer is provided which both fills the gap and integrally includes an end surface adhesive layer which protrudes outwardly from the outer circumferential ends of the adjacent resin frame members and extends in a thickness direction of the resin frame members to cover outer circumferential end surfaces of the adjacent resin frame members, such that the adhesive layer has a substantially T-shaped cross section as a whole, thereby bonding the two resin frame members together, at least one of the outer circumferential end surfaces of the two separators includes a first side edge forming the gap and a second side edge distant from the gap in the thickness direction, and the end surface adhesive layer is terminated at a position between the first side edge and the second side edge.

6. The fuel cell according to claim 5, wherein the adhesive is a hot melt adhesive.

7. The fuel cell according to claim 5, wherein the outer circumferential end surfaces of the adjacent resin frame members which are covered by the adhesive layer extend away from the gap.

* * * * *